UNITED STATES PATENT OFFICE.

ADAM H. PRENZEL, OF HALIFAX, PENNSYLVANIA, ASSIGNOR TO UNITED SHOE MACHINERY COMPANY, OF PATERSON, NEW JERSEY, A CORPORATION OF NEW JERSEY.

PROCESS FOR MAKING A SHOE-FILLER.

1,217,213.　　　　Specification of Letters Patent.　　Patented Feb. 27, 1917.

No Drawing.　　Application filed June 10, 1915.　Serial No. 33,265.

*To all whom it may concern:*

Be it known that I, ADAM H. PRENZEL, a citizen of the United States, residing at Halifax, in the county of Dauphin and State of Pennsylvania, have invented certain new and useful Improvements in Processes for Making Shoe-Fillers, of which the following is a specification.

This invention relates to an improved process for making a shoe filler.

It has heretofore been proposed to employ for shoe fillers, compositions of a waxy nature, which are usually applied hot or require the presence of heat for the application thereof to the shoe bottom. In practice these have been found to be unsatisfactory in that they injure the leather, stitching, and adjacent fabric of the shoe, that they shrink, leaving a space between the parts, and that they are sensitive to heat and in use become soft and lose their shape. Fillers that contain rosin, resinous products, or vegetable oils, owing to the presence of these substances have a tendency to make shoes squeak, and furthermore the use of rosin, and tarry and pitchy substances, in fillers cause the same to draw the feet. Various other compositions have also been employed, but these fail to answer the requirements in many respects, and among other defects are inflammable or explosive, which presents a great disadvantage in the use thereof.

The primary object of the present invention is to provide an improved filler, which can be very cheaply produced and will be entirely free from the objections referred to, one capable of being applied in a cold state, that will vulcanize or cure quickly in a cold state, that will be adherent to leather, that will be non-inflammable, that when placed in the shoe will prevent squeaking, and that will be similar to rubber vulcanized in the usual way, resilient, unaffected by cold or any reasonable degree of heat, and water repellent, but differing from rubber in being free from the drawing tendency thereof.

In carrying out the invention rubber is dissolved in benzol, high grade gasolene, naphtha, or like volatile solvents. The rubber is placed in a churn with the solvent and permitted to soak over night, and the solution is then subjected for several hours to the action of the churn. The solution is taken from the churn in the form of liquid cement and placed in a mixing machine with a large proportion of comminuted filling material, such as comminuted cork or cork dust, a small percentage of sulfur, magnesia, gutta-percha and carbon tetrachlorid. A coloring material, such as Venetian red, or lamp black may also be added. The whole is thoroughly mixed and kneaded together, the carbon tetrachlorid being added just before the completion of the mixing operation before removing the mixture from the mixing machine.

While I prefer to subject the solution resulting from the soaking of the rubber in the benzol over night, to the action of a churn to effect a more thorough or complete saturation and mixing of the rubber with the solvent, this churning step may be omitted, the soaked rubber and benzol solution (without churning) being put directly into the mixer with the other ingredients.

The proportions of the various ingredients may be varied within certain bounds but a formula which I prefer and which I have found in practice to give good results is as follows:

| | | |
|---|---:|---|
| Cork dust | 150 | parts |
| Rubber | 125 | " |
| Sulfur | 12 | " |
| Venetian red, or lamp black | 9 | " |
| Magnesia | 3 | " |
| Gasolene or benzol | 550 | " |
| Gutta-percha | 6 | " |
| Carbon tetrachlorid | 16 | " |

The mixture thus produced constitutes the filler composition. It is non-inflammable and is of a consistency capable of being spread in a cold state by hand. It is tenacious and will adhere to leather. It is adapted to be applied cold and when spread in a thin layer and exposed to the atmosphere it cures quickly, the benzol evaporates and vulcanization takes place. The mixture when applied to the leather sole enters into, combines and coalesces with the leather, becoming closely and firmly united therewith. The cured layer is like rubber vulcanized in the usual way, resilient, unchangeable in form, unaffected by cold or any reasonable degree of heat, and water repellent. It differs, however, from rubber, in not having the drawing tendency thereof and when placed in the shoe between the soles will prevent the shoe from squeaking in use.

The sulfur in the mixture acts to effect a cold cure. The tenacity and ability of the mixture to combine with and adhere to the leather is materially abetted by the gutta-percha.

The carbon tetrachlorid performs several very important functions and is a highly essential element in the composition. It renders the mixture non-inflammable. Carbon tetrachlorid itself will not discolor or in any way injure the leather, stitching of the welt, or adjacent fabric, and is instrumental in protecting these parts. It serves to keep the composition cool and counteracts or prevents the natural tendency of the rubber to draw.

It will be understood that the invention in its broader aspect comprehends the use in the mixture of the known equivalent of the several materials specifically referred to and which may be substituted therefor.

It will be noted that heat is unnecessary throughout the process either in the preparation and mixing of the ingredients or in the application of the filler to the shoe bottom. In order to vary the time of vulcanizing or curing of the filler to suit different requirements, either of three grades of benzol may be used, the fast, medium, or slow. Benzol and high grade gasolene can be used together, or to reduce the cost still more, the high grade gasolene can be used alone.

It will also be observed that the filler is composed largely of comminuted filling material such as cork, so that the same is cheap and light in construction.

The composition can be safely stored in cans and preserved in this way for a long time for future use.

While the composition produced is especially advantageous as a filler for the cavity of the inner sole of shoes, it will be understood that the same may be employed for other purposes, for instance it may be advantageously used as a box toe filler.

The shoe filling material and the shoe filled with said material are not claimed herein but form the subject-matter respectively of my co-pending application Serial No. 33,264, filed June 10, 1915, and Serial No. 34,277, filed June 15, 1915.

What I claim is:

The method of making a filling material for shoes which consists in dissolving a given amount of rubber in approximately four times its amount of a solvent, adding to the resulting solution a vulcanizing agent and comminuted filling material of an amount slightly greater than that of the rubber and a small amount of carbon tetrachlorid, and thoroughly mixing these ingredients.

In testimony whereof I hereunto affix my signature in the presence of two witnesses.

ADAM H. PRENZEL.

Witnesses:
JAS. E. NEITZ,
G. W. SHULTZ.